United States Patent

[11] 3,586,262

[72] Inventor Irving Robert Sherman
1134-D Haverford Road, Crum Lynne, Pa. 19022
[21] Appl. No. 882,649
[22] Filed Dec. 5, 1969
[45] Patented June 22, 1971

[54] FOREFLAPPED AIRFOIL
6 Claims, 11 Drawing Figs.
[52] U.S. Cl. .................................................. 244/7R, 244/42
[51] Int. Cl. .......................................... B64c 27/52
[50] Field of Search ................................... 244/7, 42, 42.6, 42.61, 42.62

[56] References Cited
UNITED STATES PATENTS
3,179,354 4/1965 Alvarez-Calderon ........ 244/7 (X)
3,478,988 11/1969 Roed ........................... 244/42 (X)

Primary Examiner—Milton Buchler
Assistant Examiner—C. A. Rutledge
Attorney—James H. Littlepage ABSTRACT: An airfoil for an aircraft capable of both vertical and horizontal flight has a forward fixed part, a flap part constituting the rear portion, and an auxiliary lower surface part, or foreflap, which is pivoted along its front edge near the leading edge of the fixed part and normally has its rear edge close against the under side of the flap. When the aircraft is in vertical flight, the rear flap and the foreflap extend downward and, together with the fixed part, form a rounded and faired shape to reduce download caused by the slipstream of rotors or propellers. At intermediate angular positions the rear flap, the foreflap, and the fixed part form a thick airfoil having an effective incidence angle to the fuselage to provide sufficient lift for transitional low speed flight. When the rear flap and foreflap are fully retracted, they and the fixed part form a normal airfoil suitable for high-speed forward flight.

INVENTOR
IRVING R. SHERMAN

BY James H. Littlepage
ATTORNEY

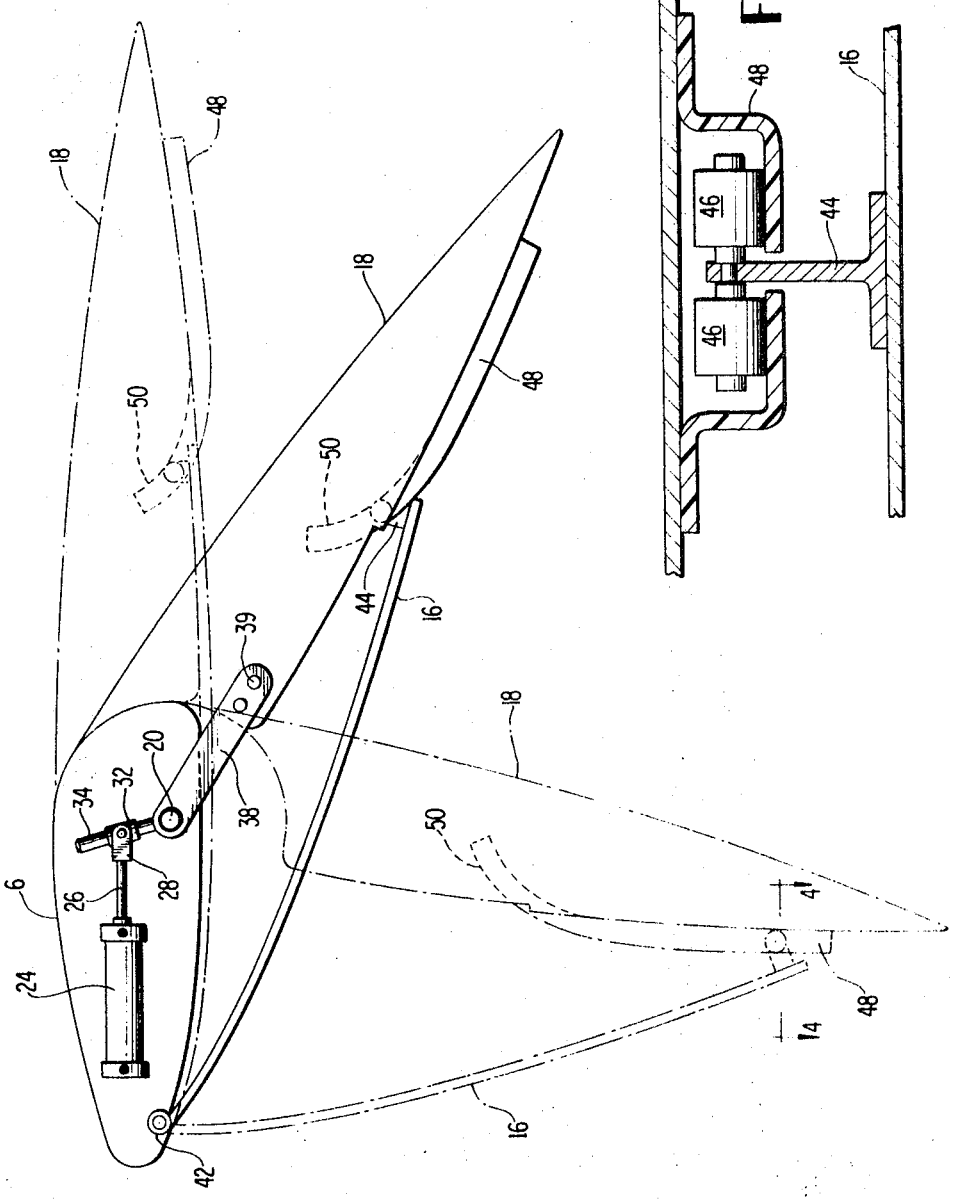

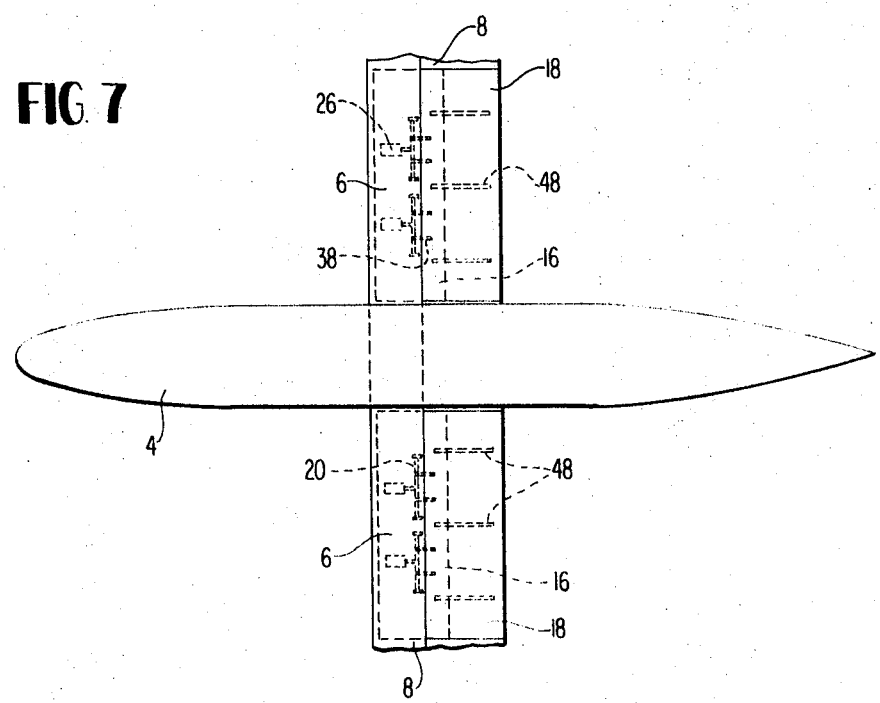
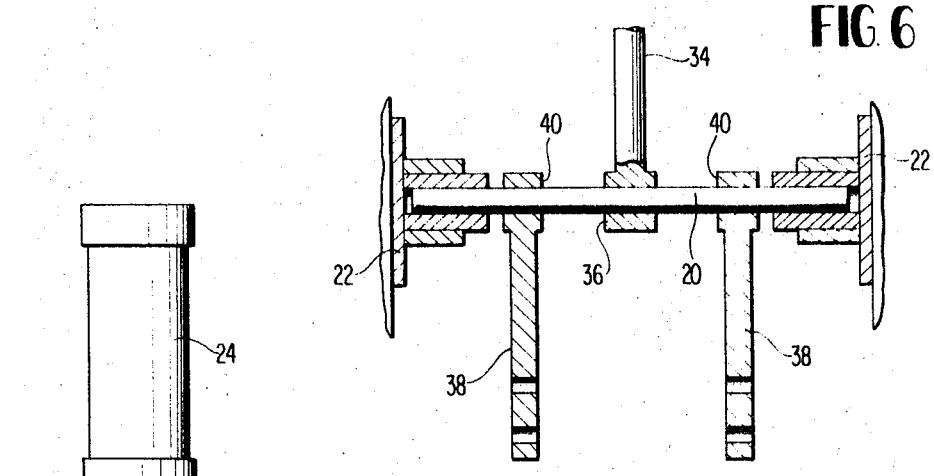
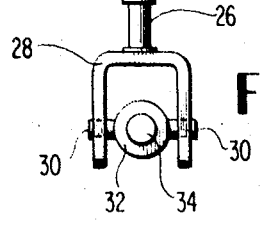

INVENTOR
IRVING R. SHERMAN

BY James H. Littlepage
ATTORNEY

3,586,262

FOREFLAPPED AIRFOIL

FIELD OF INVENTION

Aeronautics, Aircraft, Heavier Than Air, Airplane and Helicopter Sustained, Convertible.

PRIOR ART

Alvera-Calderone U.S. Pat. No. 3,179,354 and conventional flaps.

OBJECTS

In convertible aircraft, i.e., those capable of both vertical and horizontal flight, and wherein at least part of the airfoil is fixed to the fuselage, a download on the airfoil is caused by the slipstream of propellers or rotors when the aircraft is in the vertical flight mode. Though there be flaps which can be fully extended downwardly and which may constitute a major part of the airfoil surface, they, together with the fixed part of the airfoil, form a nonfaired shape which creates considerable pressure drag when exposed to the vertical slipstream of a rotor or propeller. If such an aircraft be provided with an airfoil which, in its entirety, tilts from vertical to horizontal flight modes, serious aerodynamic, weight and mechanical complexity problems are encountered in mounting the airfoil to the fuselage. When the fully tilting airfoil is in intermediate positions, i.e., when the aircraft is in transition between vertical and horizontal flight modes, its lift characteristics are unfavorable in that stall is approached too closely. For the fixed wing having flaps and/or leading edge slats, lift in transition is deficient.

The object now is to provide a wing for convertible aircraft which has a fixed forward section which may be continuous through the fuselage and provides convenient mounting for engines, propellers, and rotors.

More specifically, it is intended now to provide an airfoil comprising a forward fixed part, a rear flap which, from fore-to-aft dimensions is preferably considerably longer than the corresponding dimension of the fixed part, and an auxiliary foreflap, generally in the form of a slightly curved plate, the leading edge of which is pivoted near the leading edge of the fixed part, and the rear edge of which may be slidably coupled (as by rollers in a trackway) to the underside of the rear flap. Thus, when the rear flap is fully retracted, the foreflap lies against the undersides of the fixed part and the rear flap. When the rear flap is partly extended, the rear edge of the foreflap swings down so that the three parts form a thick airfoil; and when the rear flap is fully extended, the rear edge of the foreflap follows the underside of the rear flap downwardly. In this configuration, the fixed part of the airfoil presents comparatively little pressure surface to the vertical slipstream, and the rear and foreflaps combine to fair the underside of the fixed part.

These and other objects will be apparent from the following specification and drawings, in which:

FIG. 3 is a diagrammatic vertical cross section through an airfoil, showing, in full lines, the foreflap and rear flap in intermediate position and, in broken lines, the flaps in fully extended and fully retracted positions;

FIG. 4 is a fragmentary cross section showing the mounting of the rear portion of the foreflap on a trackway in the underside of the rear flap;

FIG. 5 is a top plan view showing the details of a double-acting hydraulic cylinder and the pivotal connection of its piston rod to the crank arm which actuates a rear flap;

FIG. 6 is an elevational view of a crank arm and pivot suitable for mounting the rear flap on the fixed forward part of the airfoil;

FIG. 7 is a diagrammatic top plan view of an aircraft, with the wing tips and engines thereon removed, showing the arrangement of the hydraulic actuating cylinder mounts for the rear flaps, and the guide channels for the rollers at the rear edges of the foreflaps;

Figure 1:
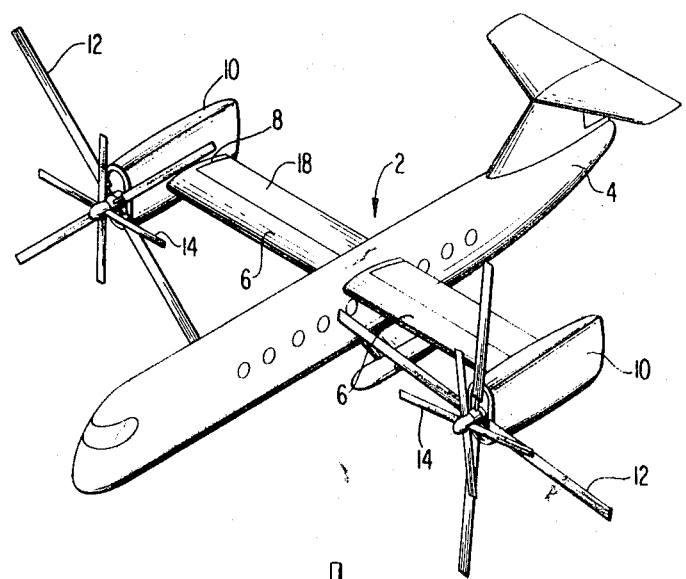
FIG. 1 is a perspective view of a compound tilt-rotor v/stol aircraft in horizontal flight mode.
Figure 2:
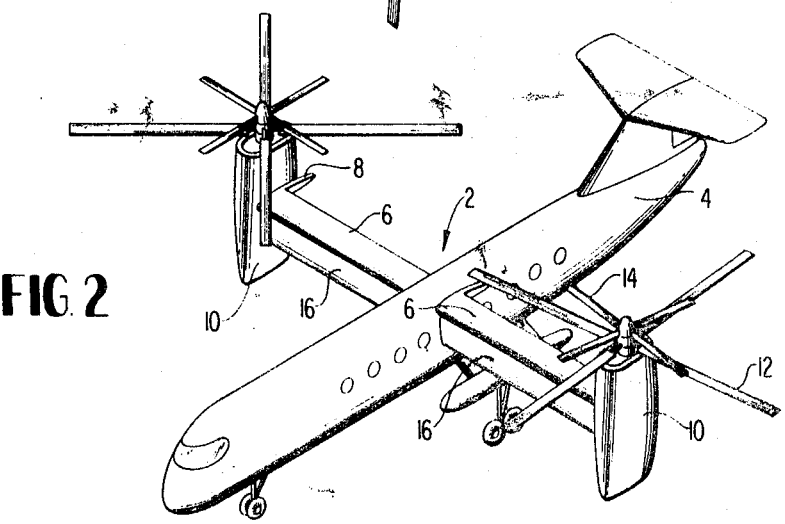
FIG. 2 is a perspective view of the aircraft shown in FIG. 1, but in vertical flight mode.

Referring now to the drawings in which like reference numerals denote similar elements and in which prime and double prime reference numerals denote elements comparable to those previously described in connection with whole number references, FIGS. 1 and 2 show the invention as applied to a compound tilt-rotor v/stol 2 having a fuselage 4, the main airfoils for which comprise front wing sections 6 which are fixed to the fuselage and which have fixed outer ends 8. Engine nacelles 10 are pivoted to the fixed outer ends 8 of the wings and are movable for forward flight mode (FIG. 1) and vertical flight (FIG. 2). The engines in nacelles 10, through suitable gearing, drive rotors 12 when in vertical flight and propellers 14 when in forward flight. The invention is primarily concerned with the fixed wing section 6, a foreflap 16', and a rear flap 18, and the manner in which they cooperate to provide different effects when the aircraft is in its two main modes of operation and in transition between the two main modes.

Referring more specifically to FIGS. 3—7, the rear flap 18, which is considerably longer in its fore and aft dimensions than the front wing section 6, is supported on the latter by means of pivot axles 20 mounted in suitable bearings 22 on the fixed front wing section 6. The rear flaps are moved from upward retracted position to downwardly extended position by means of double-acting hydraulic cylinders 24 mounted in the forward fixed wing section 6. While various mounting and actuating devices may be used, the elementary example shown in FIGS. 3—6, which is deliberately nonlinear in actuation to obtain favorable angles of attack of the foreflap, comprises, on the end of a piston rod 26, a fork 28 through the sides of which extend pintles 30. The pintles are on a slide 32 on a crank arm 34 affixed as at 36 to pivot axle 20. Arms 38 also affixed as at 40 on pivot axle 20 are connected as at 39 to rear flap 18. It will be apparent from FIG. 3 that, when piston rod 26 moves forwardly, crank arm 34 swings counterclockwise so as to rock rear flap 18 upwardly about pivot axle 20. In its upper retracted position, flap 18 forms a rearward continuation of the forward fixed wing section 6; and, when flap 18 is fully extended downwardly, its free edge lies below fixed wing section 6. Additional independent flap arms 38 can be used to insure transfer of a major portion of bending moment to the rear flap when in vertical flight mode.

Foreflap 16, which is essentially a slightly curved plate, is pivoted at its leading edge by a hinge 42, which is supported beneath and just behind the leading edge of fixed wing section 6. The trailing edge of foreflap 16 is slidably supported to the underside of rear flap 18 by suitable mechanism such as brackets 44 on which rollers 46 are mounted. Rollers 46 roll within a trackway 48 whose forward end is curved upwardly as at 50 into rear flap 18 so that when the latter is retracted upwardly, the trailing edge of foreflap 16 fairs into the underside of the rear flap. Alternatively, the foreflap may be spring-loaded or independently hydraulically or electrically actuated.

FIG. 3 and FIGS. 8—10 illustrate the action of the three airfoil parts, i.e., the forward fixed wing section 6, the foreflap 16 and the rear flap 18. In the vertical flight mode of the aircraft (FIG. 8), rear flap 18 has been swung downwardly and slightly forward, and the trailing edge of foreflap 16 has followed the underside of rear flap 18 so that the foreflap 16 extends downwardly and rearwardly. Only the top surface of the fixes swing section 6 is exposed to the pressure of the slipstream from the rotor or propeller, and the underside of the fixed wing section 6 has been faired to generally streamline form so as to minimize the effect of the down-pressure on the fixed wing section. In the transition between vertical flight mode and forward flight mode, the rear flap 18 has been swung upwardly to an intermediate position and the trailing edge of the foreflap 16 has followed the underside of the rear flap, and a relatively thick wing section is formed. In forward flight mode, rear flap 18 lies behind fixed wing section 6 and foreflap 16 lies against the undersides of the fixed wing section 6 and rear flap 18.

Figure 11:
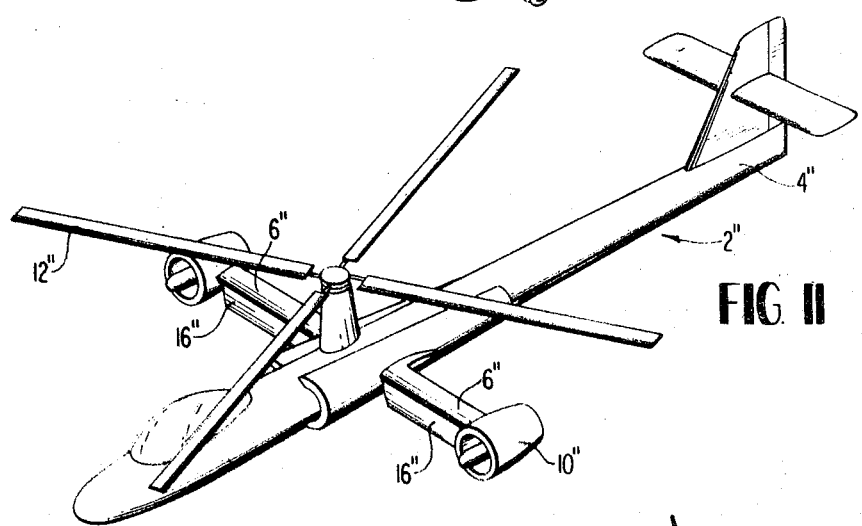
FIG. 11 is a perspective view of a compound helicopter with the fore and rear flaps in vertical flight mode.
Figure 8:
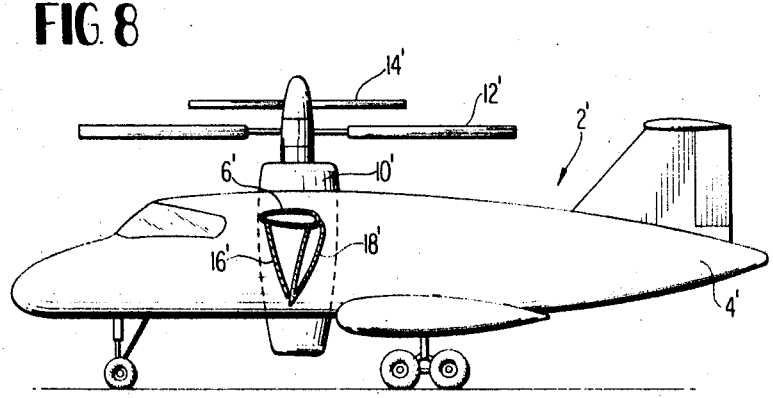
FIG. 8 is a side elevation of another type of tilt-rotor v/stol aircraft in vertical flight mode, with the left-hand airfoil shown in cross section.
Figure 9:
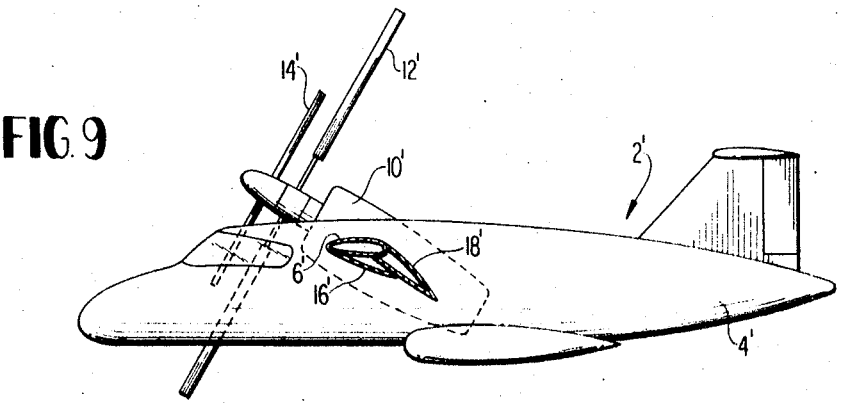
FIG. 9 is a view similar to FIG. 8, but showing the airfoil when the aircraft is in transitional mode.
Figure 10:
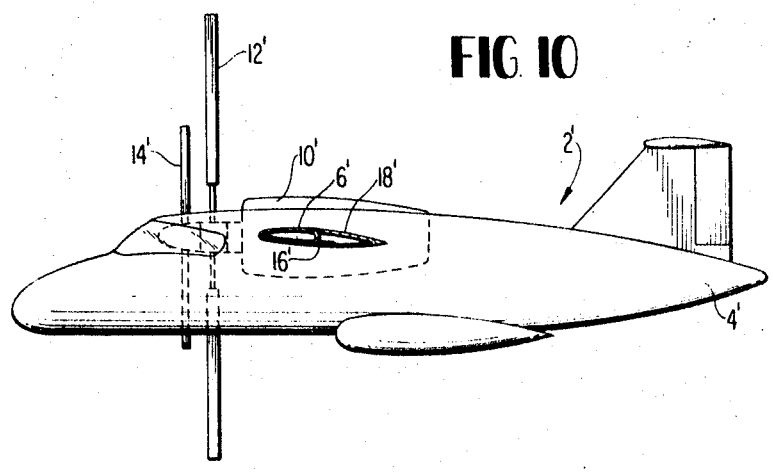
FIG. 10 is a view similar to FIGS. 8 and 9, but showing the airfoil when the aircraft is in forward flight mode.

The invention may be applied to other types of convertible or hybrid aircraft, for example, the compound helicopter shown in FIG. 11. In this type of aircraft the ducted fans 10'' mounted on the tips of fixed wing section 6'' do not pivot. In vertical flight the fans rotate at zero net thrust with differential blade angle providing yaw control. This aircraft is lifted in vertical flight by a rotor 12'' mounted on the top of fuselage 4''. However, in vertical flight mode, foreflaps 16'' swing downwardly in the same manner as foreflaps 16 or 16' previously described. Where tilt-rotor and/or tilt propeller mechanisms are mounted on the fixed wing sections, a suitable programmer may be used for controlling the movements of the flaps in harmony with the changes in tilt-angle or propellers or rotors. Alternatively, nacelles and rear flaps may be interconnected with a slot and slider or with a roller and track. The actuated flaps may then be used to drive the nacelles. If pitch cyclic is used as primary angular drive of nacelles, then the actuated flaps will pace the tilt rate.

I claim:

1. A wing for aircraft which are convertible between vertical flight and forward flight modes, which comprises
    a fixed wing member affixed to and projecting outwardly from a fuselage,
    a rear flap pivoted to said fixed wing section and movable between a retracted position in which it extends generally rearward of the fixed wing section and an extended position in which it extends generally downward from the fixed wing section,
    means for moving said rear flap between said positions, and
    a forflap mounted beneath the fixed wing section comprising
    a generally planar member having a leading edge pivoted to the fixed wing section and adjacent to the leading edge thereof and a trailing edge movable closely adjacent the underside of said rear flap member,
    the trailing edge of said foreflap closely following the underside of said rear flap during said movements of the latter.

2. The combination claimed in claim 1, and means movably holding the trailing edge of said foreflap close to the underside of said rear flap.

3. The combination claimed in claim 2, said means comprising a trackway extending in the fore-and-aft direction on the rear flap member, and roller means on said foreflap adjacent the trailing edge thereof, said roller means engaging in said trackway.

4. The combination claimed in claim 1, and spring loading means for holding the trailing edge of the foreflap closely adjacent the underside of the rear flap as the latter moves from retracted to extended positions and vice versa.

5. The combination claimed in claim 1, and means for independently actuating the foreflap in conjunction with the actuation of the rear flap, whereby the trailing edge of the foreflap is maintained closely adjacent the underside of the rear flap as the latter moves from retracted to extended positions and vice versa.

6. In a wing, tailplane or stabilizing surface on an aircraft capable of vertical or short takeoff or landings,
    a forward section rigidly fixed with respect to a fuselage,
    an aft section comprising at least one flap means,
    an auxiliary lower surface section hinged close to the leading edge of the forward section, and
    means for moving said aft section and said auxiliary lower surface section between a retracting position in which said aft section trails behind said forward section and said auxiliary lower surface section has closely adjacent the undersides of said forward and aft sections,
    a fully extended position in which said aft section and said auxiliary lower surface section cooperate to provide a faired form beneath the forward section, and
    intermediate positions in which said three sections cooperate to provide a thick airfoil having an effective incidence angle to the fuselage to provide favorable lift characteristics for low speed transitional flight.